United States Patent [19]

Freixinos

[11] 4,355,675
[45] Oct. 26, 1982

[54] DEVICE FOR REMOVING A TIRE FROM ITS RIM

[75] Inventor: Raymond Freixinos, Chamalieres, France

[73] Assignee: Compagnie Generale des Etablissements Michelin, Clermont-Ferrand, France

[21] Appl. No.: 237,759

[22] Filed: Feb. 24, 1981

[30] Foreign Application Priority Data

Feb. 26, 1980 [FR] France ................................ 80 04288

[51] Int. Cl.³ .............................................. B60C 25/06
[52] U.S. Cl. .................................................. 157/1.17
[58] Field of Search ................................ 157/1.1, 1.17

[56] References Cited

U.S. PATENT DOCUMENTS

| | | | |
|---|---|---|---|
| 2,822,863 | 2/1958 | Regnault | 157/1.17 |
| 3,578,058 | 5/1971 | Allen | 157/1.17 |
| 3,847,197 | 11/1974 | Konen | 157/1.17 |
| 4,256,161 | 3/1981 | Chisum | 157/1.17 |

*Primary Examiner*—James G. Smith
*Attorney, Agent, or Firm*—Brumbaugh, Graves, Donohue & Raymond

[57] ABSTRACT

In order to operate with maximum efficiency and safety, this device comprises two tubular assemblies which bear a jaw-holder block and can slide one within the other. An interlock system is arranged between the tubular assemblies and the jaw-holder block in order to control the sliding of the inner tubular assembly by that of the outer tubular assembly. The tire push member borne by the inner tubular assembly can push the sidewall of the tire back only when the fixed and movable jaws strongly clamp the flange of the rim. This device is preferably operated by a pneumatic impact wrench.

12 Claims, 7 Drawing Figures

DEVICE FOR REMOVING A TIRE FROM ITS RIM

The present invention concerns an apparatus designed to facilitate the removal of a tire mounted on a wheel.

When a tire has remained on its rim for a rather long period of time, it is necessary, in order to detach one of its two sidewalls from the flange of the rim, to exert on the sidewall in question a push which exceeds the muscular strength of an average person in the case of tires of large sizes. In order to effect this work there is therefore employed a tool which is commonly known as a bead prier. There are manually operated bead priers for use on small tires and bead priers operated with pneumatic or hydraulic assistance for larger tires.

A hydraulic bead prier is described, for example, in U.S. Pat. No. 3,847,197. The head of this apparatus has, on the one hand, an articulated clamping jaw which is driven by an electric motor and is intended to be applied under the flange of the rim and, on the other hand, a fixed jaw formed of two hooks which are intended to be applied against the inner wall of the flange of the rim, that is to say against the portion of the flange which is normally in contact with the outer wall of the bead of the sidewall of the tire. Between these two fixed hooks there can slide a central push member which is provided with a spatula and the purpose of which is to push against the bead of the sidewall of the tire so as to move it away from the inner wall of the flange of the rim and bring it towards the other bead. When the bead has thus been moved away (pried) from the flange of the rim, the tire can be removed relatively easily from the rim.

The known bead priers of this type have two major drawbacks. On the one hand, the drive for the articulated clamping jaw intended to be applied under the flange of the rim so as to enclose the flange between it and the fixed hooks is separate from the drive for the sliding of the central push member. These two drives are, however, dependent on each other in order that the sliding of the central push member can only take place after the two jaws have properly clamped the flange of the rim. In the known apparatus described in the above-mentioned U.S. patent, these drives comprise piston-cylinder units and hydraulic spring valves. They are therefore relatively complicated and it may happen that a misadjustment of these members causes the sliding of the central push member to start before the complete clamping of the jaws, resulting in the danger of an injury to the user of the apparatus. On the other hand, it may happen that the central push member damages the sidewall of the tire, because the spatula which is fixed at the end of the push member exerts on the sidewall of the tire an action which is localized on a very small area.

The object of the invention is therefore to eliminate these drawbacks and thus to create a bead prier device which, on the one hand, by means which are as simple, reliable and inexpensive as possible, assures the energetic clamping of the flange of the rim before the push against a sidewall of the tire can commence and, on the other hand, has a push member which for all practical purposes cannot damage the tire.

In order to achieve this purpose, starting with a bead prier device having a fixed jaw, a movable jaw cooperating with the fixed jaw and a tire push member which is driven by a mechanism which assures its axial displacement with respect to the jaws, the invention provides a device which is characterized by the fact that it comprises outer and inner tubular assemblies which bear a jaw-holder block and are engaged one within the other and are axially slidable, limited by stops, with respect to each other and with respect to the jaw-holder block; by the fact that one end of the outer tubular assembly bears an articulation for the movable jaw while its other end is fastened to a motor which controls the axial sliding of the two tubular assemblies; by the fact that the inner tubular assembly bears the tire push member; and by the fact that an interlock system is interposed radially between the inner tubular assembly, the jaw-holder block and the outer tubular assembly in order to make the sliding of the inner tubular assembly subject to the sliding of the outer tubular assembly.

In this arrangement, the jaw-holder block has a front face and a rear face, is provided with guide means for the movable jaw and bears the fixed jaw on its front face, the jaw-holder block also having an axial bore which traverses it and within which the inner tubular assembly can slide, and having, on the same side as its rear face, an axial annular slot of larger inside diameter than the axial bore and within which the outer tubular assembly can slide. This axial annular slot is defined in radial direction, on the one hand, by an outer axial bushing which is fastened to the rear face of the jaw-holder block and, on the other hand, by an axial tubular guide which is also fastened to that rear face.

The end of the outer tubular assembly which is included within the axial annular slot has the form of a collar whose rear face is located axially opposite a radial shoulder which is integral with the outer axial bushing at the end of the latter which is opposite the rear face of the jaw-holder block.

The movable jaw is articulated on the outer tubular assembly via two side plates which are parallel to each other and to an axial plane of the jaw-holder block, which side plates are arranged at a distance from each other on opposite sides of the fixed jaw. Each side plate has a guide groove which forms a cam within which there is engaged a fixed pin which is integral with the jaw-holder block, the movable jaw being held between the two side plates and opposite the fixed jaw.

In a preferred embodiment, the two side plates which bear the movable jaw are articulated on a nut which has a pivot pin and is screwed onto a threaded section of the outer tubular assembly located outside of the jaw-holder block.

A very simple and reliable interlock system which assures that the sliding of the inner tubular assembly can take place only after the two jaws have been vigorously closed comprises, on the one hand, at least one ball retained both in a radial recess of frustoconical shape provided in the radially outer wall of the inner tubular assembly and in a cylindrical radial recess provided in the jaw-holder block radially inward of the axial annular slot and, on the other hand, a radial recess for the ball provided in the inner wall of the outer tubular assembly at the end of the outer tubular assembly contained within the axial annular slot of the jaw-holder block.

In order to assure the axial sliding of the two tubular assemblies with respect to each other and with respect to the jaw-holder block, an axial worm is provided integral with the motor and arranged coaxially in the inner tubular assembly and cooperating with a nut which is integral with the inner tubular assembly and mounted for sliding with the latter in the outer tubular assembly.

When the bead-prier device is to be used on rims whose flanges have a thickness which may vary a few millimeters, the interlocking system of the invention described above would not give full satisfaction. As a matter of fact, with rim flanges which are thicker than those for which the interlock system has been designed, this system would remain blocked and would therefore prevent the inner tubular assembly from moving axially in order to push back the sidewall of the tire. In order to avoid this drawback, the invention contemplates adding the following additional means to the device described above:

(a) an axial bushing mounted for axial sliding within that part of the outer tubular assembly which is engaged in the axial annular slot of the jaw-holder block, the axial bushing having an outside diameter slightly less than the inside diameter of said part and having an inside diameter slightly greater than the inside diameter of the axial annular slot, the axial bushing having an end face located outside of the axial annular slot and a frustoconical end face contained within the axial annular slot;

(b) an axial stop integral with the inner wall of the outer tubular assembly and located, with reference to the end of said assembly which is contained in the axial inner slot, at a greater distance away than the end face of the axial bushing located outside of the axial annular slot; and (c) a compression spring resting against the end face of the axial bushing located outside the axial annular slot and resting against the axial stop.

Due to the presence of the axial bushing which can slide in the axial annular slot of the jaw-holder block, the ball of the interlock system may, even in the case of a very thick rim flange which prevents maximum approach of the movable jaw with respect to the fixed jaw, emerge radially from its frustoconical radial recess provided in the radially outer wall of the inner tubular assembly, pushing said bushing back which then compresses the compression spring. This inner tubular assembly may then slide in the outer tubular assembly.

In order that the tire push member not act only at a single place on the sidewall of the tire to be removed, this member has, in known manner, a U shape, the web of which is fastened to the end of the inner tubular assembly which is located in front of the front face of the jaw-holder block, the arms of the U-shaped tire push member being arranged on opposite sides of the fixed jaw. Since the tire push member is fastened to that end of the inner tubular assembly which is located on the front-face side of the jaw-holder block, it can at the same time serve as a stop which limits the axial sliding of the inner tubular assembly with respect to the jaw-holder block in the direction towards the motor.

In its simplest form, the motor may consist of a lever adapted to be connected to the axial worm and manually driven in rotation. However, it is preferred for the motor to be, for instance, electrical or pneumatic; in such latter case, a commercial impact wrench which is reversably rotatable is particularly well suited. The output of such an impact wrench is coupled to the axial worm via an extension of the worm mounted in needle thrust bearings and in a needle bushing installed in the end of the outer tubular assembly adjacent the impact wrench.

Although the device in accordance with the invention in its preferred embodiment comprises an axial worm associated with a nut to control the axial sliding of the two tubular assemblies with respect to each other and with respect to the jaw-holder block, this sliding may, as a variant, be caused by a hydraulic or pneumatic fluid acting on a piston.

One illustrative embodiment of the invention is described in detail below with reference to the accompanying drawing in which.

Figure 1:
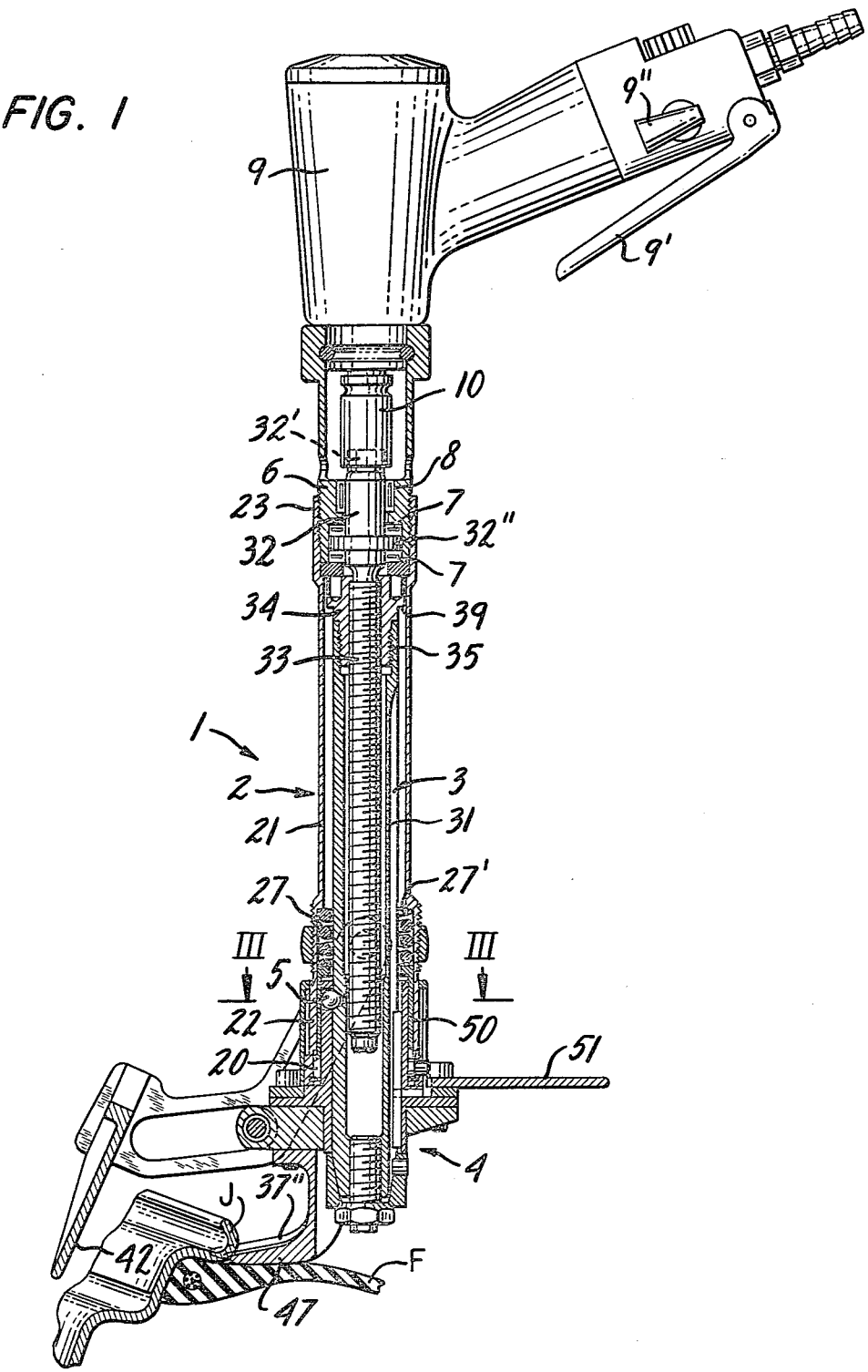
FIG. 1 is a view in longitudinal section through a bead-prier device in accordance with the invention, shown with the jaws open.

The bead-prier device 1 consists essentially of an outer tubular assembly 2 which comprises essentially a sleeve 21 of generally cylindrical shape, of an inner tubular assembly 3 which comprises essentially a spindle 31 and can slide axially in the sleeve 21, of a jaw-holder block 4 borne by the two tubular assemblies 2 and 3, and of a system of interlock by means of balls 5, which interlock system is interposed in the jaw-holder block 4 between the two tubular assemblies.

In detail, the sleeve 21 of the outer tubular assembly 2 by means of which the device 1 can be held with one hand has an end 22 which is housed, with the possibility of axial sliding, in an axial annular slot 41 of the block 4. The other end 23 of the sleeve 21 serves as housing for a bearing bushing 6 in which there are fixed two axial needle thrust bearings 7 and a radial bushing also having needles 8. In these thrust bearings and bushing the smooth end 32 of a threaded rod or worm 33 can turn. The worm 33 can turn in a round nut 34 which, on the one hand, can slide axially in the sleeve 21 and, on the other hand, is provided with a thread 35 by which it is screwed in a corresponding internal thread provided at the end of the spindle 31.

The sleeve 21 comprises, at the end thereof adjacent to the jaw-holder block 4, a threaded section 24 on which there is threaded a nut 25 provided with two coaxial pins 26 which serve as pivot pins for the movable jaw 42. This movable jaw 42 is borne between two side plates 43 articulated on the pins 26. Each of these side plates 43 has a guide groove 44 within which there is received a roller 45 which is fixed for rotation on a shaft 46 parallel to the pins 26 of the nut 25. This shaft 46 is integral with the jaw-holder block 4. On the front face 4' of this jaw-holder block 4 the fixed jaw 47 is fastened by screws 47'. This fixed jaw 47 is of hook shape, the end thereof being directed towards the movable jaw 42.

The axial annular slot 41 in the jaw-holder block 4 is contained between an axial bushing 48 fastened on the rear face 4'' of the jaw-holder block 4 and an axial tubular guide 49 fastened on this same face. The spindle 31 can slide axially in the bore 4A of this tubular guide 49.

In the wall of the spindle 31 of the inner tubular assembly 3 there are provided, in the same transverse plane located in the field of the jaw-holder block 4, recesses 36 which are distributed all around the circumference of this spindle 31 and in each of which there is partially contained a ball 5. These recesses 36 have a frustoconical wall and are, until the movable jaw 42 is completely closed, located opposite radial cylindrical recesses 49' passing through the axial cylindrical wall of the tubular guide 49 and debouching towards the axial annular slot 41 of the jaw-holder block 4.

On its end located in front of the jaw-holder block 4 the spindle 31 bears a tire push member 37. This tire push member 37 is of U shape, the web 37' of which is held at the end of the spindle 31 by a screw 38. This web 37' at the same time forms a stop against the axial tubular guide 49 of the jaw-holder block 4, thus limiting the axial sliding of the spindle 31 in the direction of the bearing 6. The two arms 37" of the tire push member 37 are arranged on opposite sides of the hook-shaped fixed jaw 47.

The bearing bushing 6 is attached to a motor consisting in this example of a pneumatically operated impact wrench 9 which is actuated by a manual trigger 9'. The direction of rotation of this impact wrench 9 is reversible by means of the knob 9". A hollow hexagon bushing 10 which is rigidly connected with the turning output of this impact wrench 9 is in engagement with a hexagonal tip 32' of the smooth section 32 of the threaded rod or worm 33. This smooth section 32 has between its two ends a collar 32" which is held between the two needle thrust bearings 7 in the bearing bushing 6.

The end 22 of the sleeve 21 which is located in the annular slot 41 is in the form of a collar, the rear face of which constitutes a shoulder 22' located axially opposite a similar shoulder 48' which terminates the outer axial bushing 48 at its rear end. The distance D between these two shoulders 22' and 48' represents the axial displacement stroke of the outer tubular assembly 2 with respect to the jaw-holder block 4 and the inner tubular assembly 3.

Between the axial tubular guide 49 and the fixed outer axial bushing 48, that is to say in the axial annular slot 41, there can freely slide an inner axial bushing 50 having an end 50' located in the axial annular slot 41 and an end 50" located outside of the axial annular slot 41. A compression spring 27 is interposed between the outer end 50" and an axial stop 28 provided on the inside of the sleeve 21 and rigidly connected to the latter. The inner end 50' of the axial bushing 50 is flared in the direction towards the jaw-holder block 4. The length of the inner axial bushing 50 contained within the annular slot 41 is shorter than that of the end 22 of the sleeve 21 which surrounds it, so that between a stop ring 29 provided in the inner wall 21' of the sleeve 21 and the flared end of the inner axial bushing 50 there remains a free space 20 within which the top of the balls 5 can be housed. The radial distance between the inner wall 21' and the outer wall 49' of the tubular guide 49 is very slightly greater than the radial distance by which the balls 5 are engaged in the conical recesses 36 when they occupy the interlocked position shown in FIGS. 1 and 1A.

The stroke of the inner tubular assembly 3 in the direction towards the sidewall F of the tire is limited by a shoulder 39 which is integral with the nut 34 which comes against the end 27' of the spring 27.

Finally, in order to permit the user to exert greater force on the device 1 so as to introduce the fixed jaw 47 and the tire push member 37 between the bead of the tire to be removed and the flange J of the rim on which the tire is held, a retractable footrest 51 is articulated on the jaw-holder block 4.

Figure 1A:
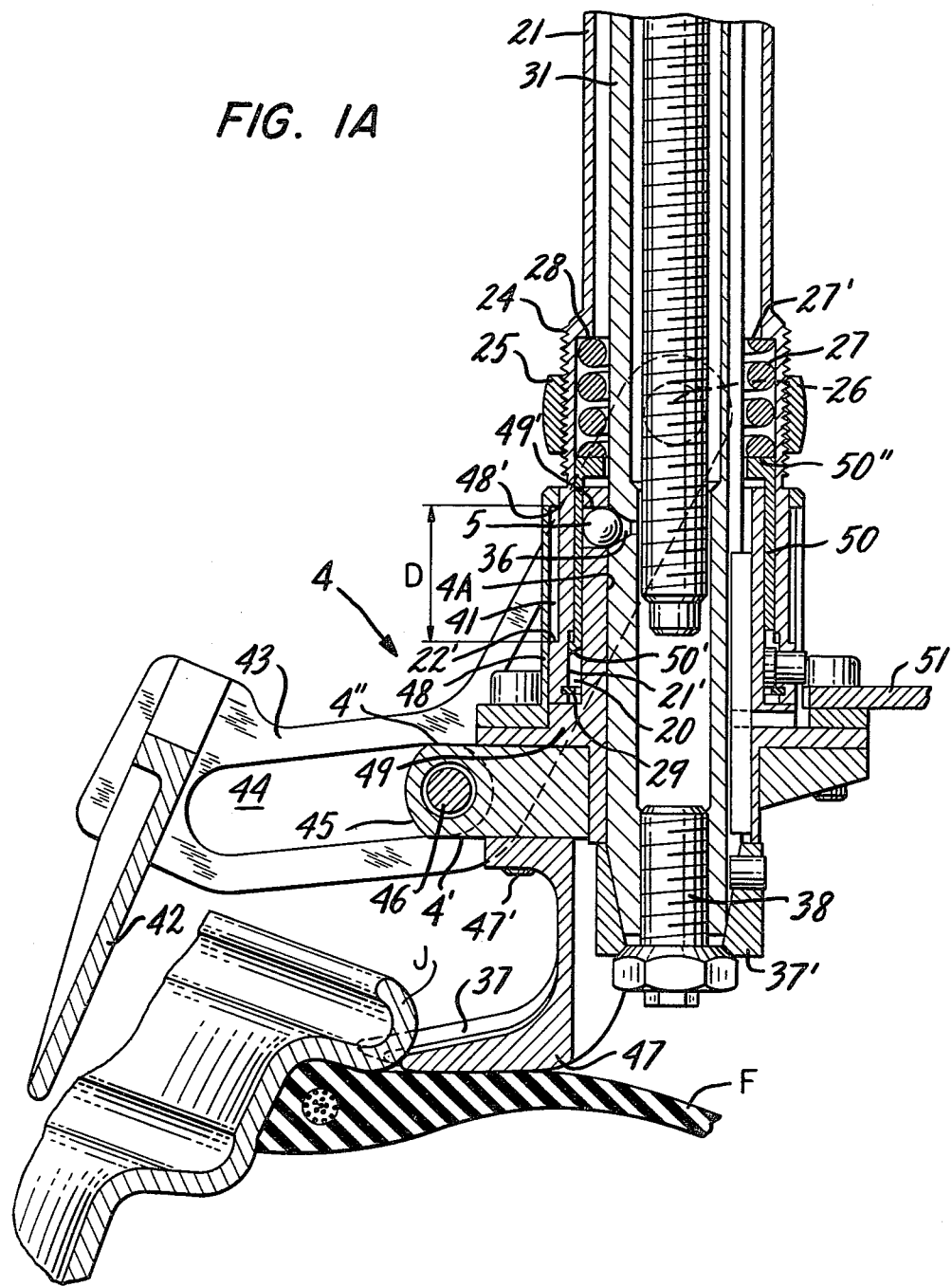
FIG. 1A is a view on a larger scale of the front part of the device shown in FIG. 1.
Figure 2:
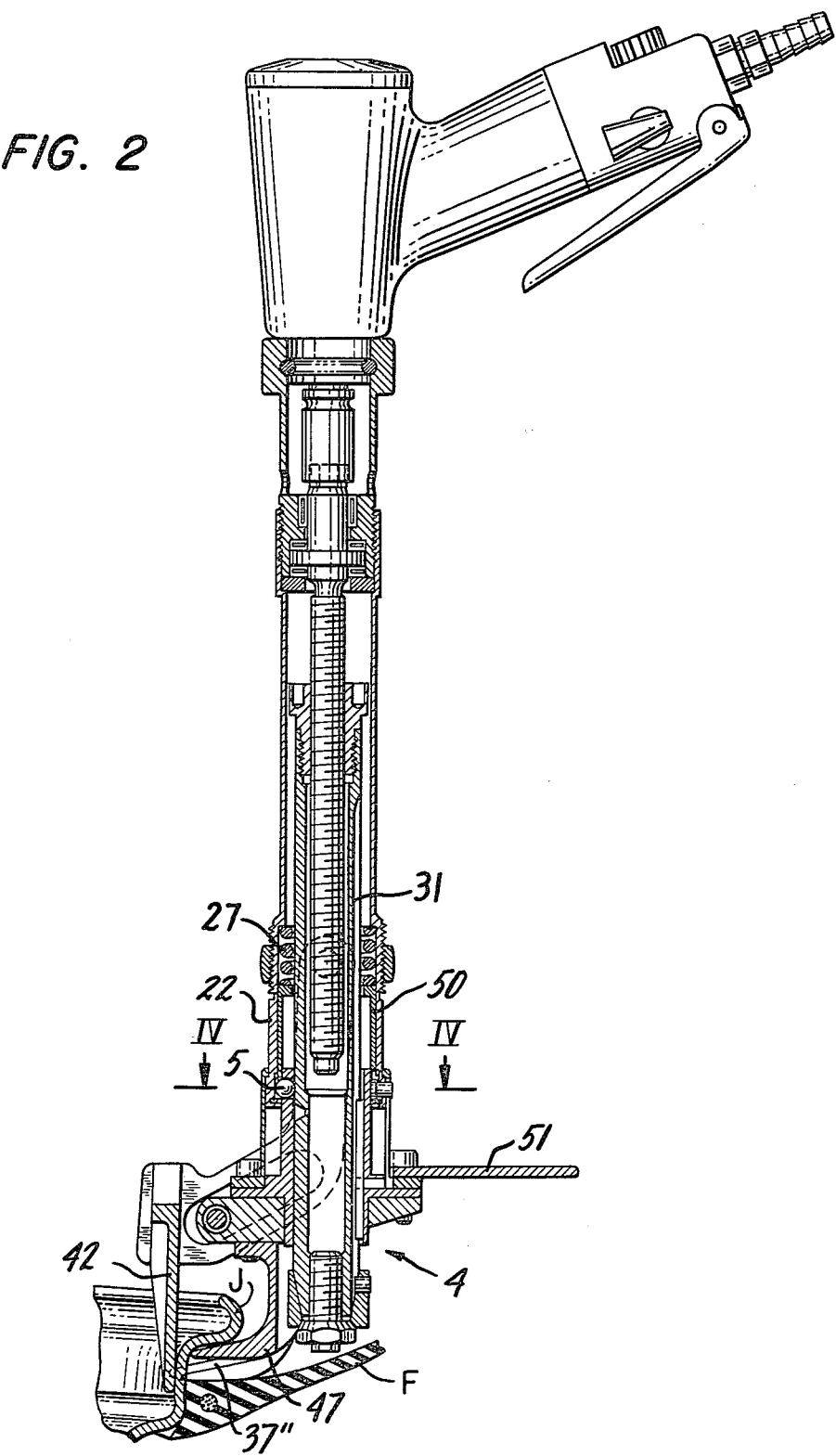
FIG. 2 is a view similar to FIG. 1 showing the device with its jaw closed.
Figure 2A:
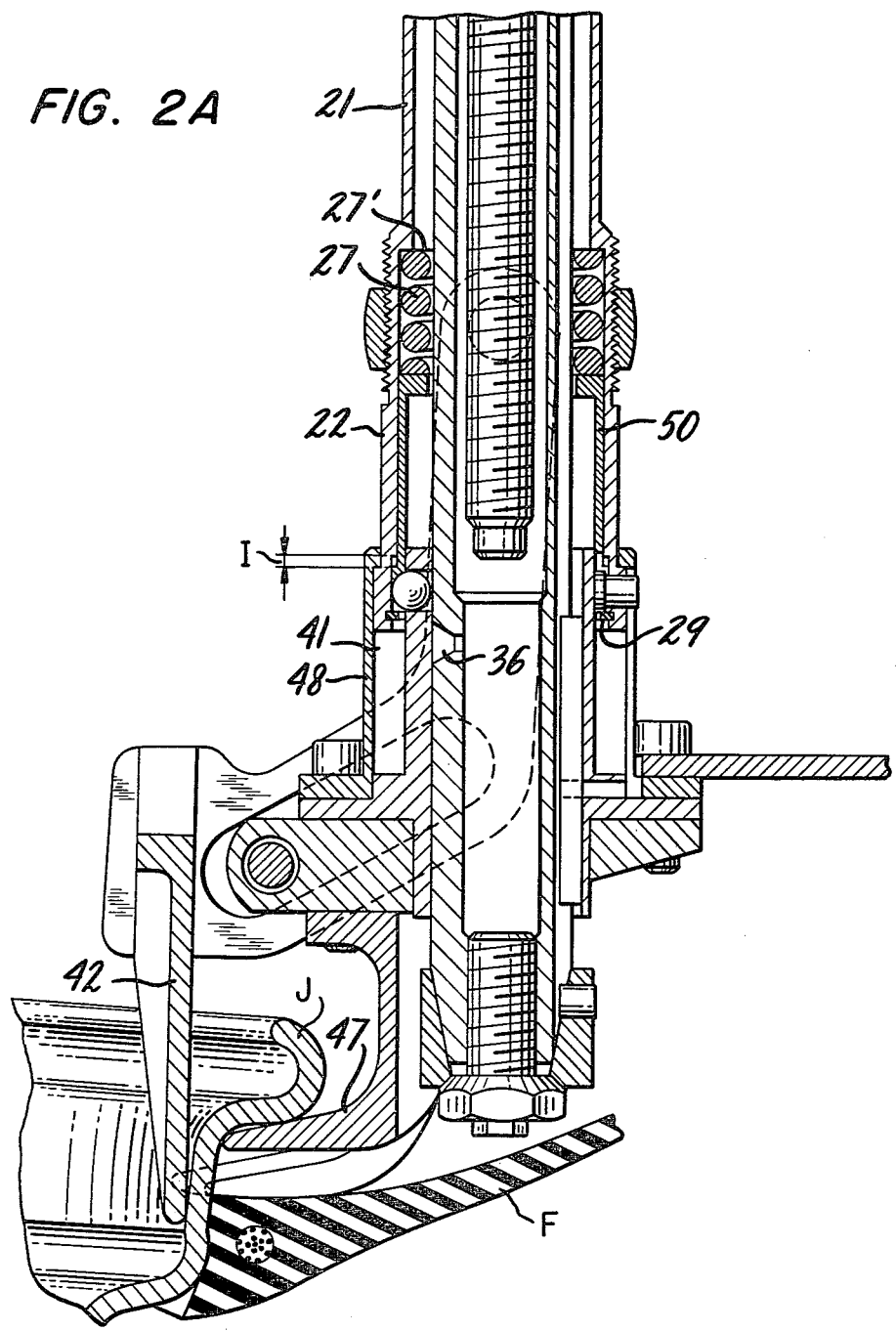
FIG. 2A is a view on a larger scale of the front part of the device shown in FIG. 2.
Figure 3:
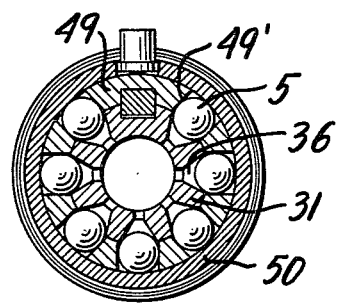
FIG. 3 is a cross-sectional view through the ball interlock system along the line III—III of FIG. 1 (jaws apart; interlocked position)

The device described above, starting from the relative position which its different parts occupy in FIG. 1, operates as follows:

After the operator who holds the device 1 has engaged the fixed jaw 47 and the arms 37" of the tire push member 37 between a rim flange J and the sidewall F of the tire to be removed, he presses the trigger 9' of the impact wrench 9, which is connected to a source of compressed air (not shown). The output bushing 10 of this wrench 9 then turns and drives the threaded rod or worm 33 in rotation via the hexagonal tip 32' and the smooth section 32 of the worm 33. Since the inner tubular assembly 3 cannot move axially due to the interlock balls 5, the outer tubular assembly 2 describes, with respect to the inner tubular assembly 3, an axial displacement which moves the outer tubular assembly 2 away from the jaw-holder block 4. This displacement ceases when the rear face 22' of the collar 22 of the sleeve 21 touches the shoulder 48' which terminates the stationary outer axial bushing 48. In this position, in which the distance D has become zero, as shown in FIG. 2A, the outer tubular assembly 2 can no longer continue to move away from the jaw-holder block 4. The motor 9 continues to turn the threaded rod or worm 33. It is then the inner tubular assembly 3 which moves with respect to the outer tubular assembly 2, because the balls 5 can emerge from their conical recesses 36 under the effect of the axial push exerted on them by the spindle 31. During the displacement of the outer tubular assembly 2 with respect to the jaw-holder block 4, the nut 25 threaded on the outer tubular assembly 2 has, upon moving back, carried along with it the two side plates 43 which bear the movable jaw 42. These side plates 43 have thus described a curvilinear trajectory imposed by their guide grooves 44 and the rollers 45, and at the end of the stroke (D=zero) the movable jaw 42 has come into contact with the flange J of the rim, which flange J is thus clamped between the movable jaw 42 and the fixed jaw 47 which was introduced at the start of the operation between this rim flange J and the sidewall F of the tire to be removed.

Figure 4:
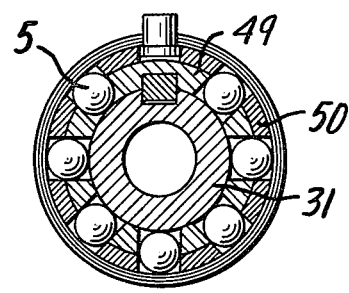
FIG. 4 is a cross-sectional view through the ball interlock system along the line IV—IV of FIG. 2 (jaws closed; unlocked position)

When the rim flange has a thickness slightly greater than that for which the dimension D has been calculated, this dimension D cannot become zero and the unlocking cannot take place. It is here that the inner axial bushing 50, whose end face 50' contained within the axial annular slot 41 is frustoconical, enters into action. The balls 5, which transmit to the end face 50' the thrust which has been received from the motor 9 via the spindle 31, push the bushing 50 back axially against the force exerted on the bushing 50 by the compression spring 27. The bushing 50 being thus pushed back, the balls 5 emerge completely from their recesses 36; the system is therefore unlocked, as illustrated in FIGS. 2, 2A and 4. In this position, the inner tubular assembly 3 can emerge axially from the outer tubular assembly 2 and, via the tire push member 37, move the sidewall F of the tire away from the rim flange J, which is still held clamped between the movable jaw 42 and the fixed jaw 47.

In order to withdraw the device 1, it is sufficient to reverse the direction of operation by means of the knob 9", which controls the direction of rotation of the impact wrench 9. The inner tubular assembly 3 then reenters into the outer tubular assembly 2, the balls 5 drop back into their conical recesses 36, and, as from this moment, the outer tubular assembly 2 moves up to the position illustrated in FIG. 1. This displacement causes the opening of the movable jaw 42.

Adjustment of the axial position of the nut 25 which is screwed onto the threaded section 24 of the sleeve 21 makes it possible to regulate the stroke of the movable jaw 42 and therefore the distance between the movable jaw 42 and the fixed jaw 47 in the clamped position of the rim flange. The more this nut 25 is moved away from the jaw-holder block 4, the closer the movable jaw 42 can come to the fixed jaw 47. The clamping force of the jaw depends on the power of the spring 27 in the sleeve 21. This spring 27 has, furthermore, the advantage of permitting, for a given position of the nut 25 on the threaded section 24, an accomodation between the jaws and rim flange whose thickness may vary within certain limits. For this, and in order to assure a vigorous clamping of the jaws on both sides of the rim flange, it is important that the bushing 50 can move axially in the sleeve 21 so as to compress the spring 27 at the end of the clamping stroke of the jaws. This possibility of axial displacement is assured due to the presence of the space I (FIG. 2A) between the rear face of the inner end of the bushing 50 and an inner shoulder on the end 22 of the sleeve 21.

In order to facilitate the operation of the device, it may have a lubricant feed (not shown) which debouches into the region of the fixed jaw and/or of the tire push member.

Figure 5:
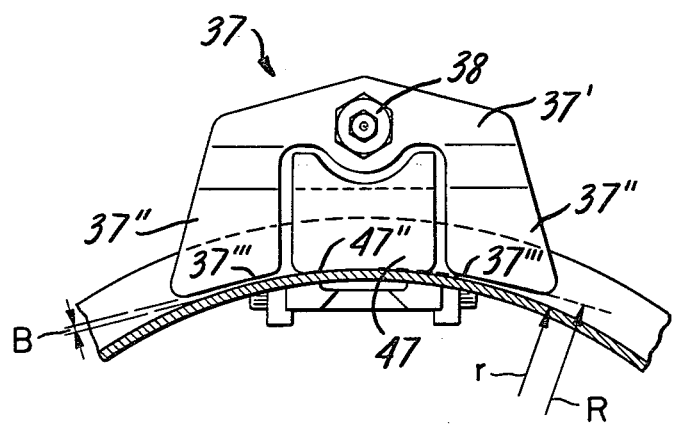
FIG. 5 is an end view of the tire push member and of the closed jaws of the device of the invention.

It is advantageous, as shown in FIG. 5, for the radius R of the arc to which the edge 47' of the fixed jaw 47 and the edges 37''' of the tire push member 37 are tangent to be greater than the radius r of the seat of the rim in order to leave some play B between the edges 37''' and the seat.

Finally, it is advantageous to employ as the motor a device which produces vibrations, such as a pneumatic impact wrench. As a matter of fact, when the tire adheres very firmly to the tire rim, these vibrations favor the loosening.

What is claimed is:

1. A device for removing a tire from a rim having at least one circumferential flange, said device, which comprises a fixed jaw, a movable jaw cooperating with the fixed jaw and a tire push member which is driven by a mechanism which assures its axial displacement with respect to the jaws, being characterized by the fact that it comprises outer and inner tubular assemblies which bear a jaw-holder block and are engaged one within the other and are axially slidable, limited by stops, with respect to each other and with respect to the jaw-holder block; by the fact that one end of the outer tubular assembly bears an articulation for the movable jaw while its other end is fastened to a motor which controls the axial sliding of the two tubular assemblies; by the fact that the inner tubular assembly bears the tire push member; and by the fact that an interlock system is interposed radially between the inner tubular assembly, the jaw-holder block and the outer tubular assembly in order to make the sliding of the inner tubular assembly subject to the sliding of the outer tubular assembly.

2. A device according to claim 1, characterized by the fact that the jaw-holder block has a front face and a rear face, is provided with guide means for the movable jaw and bears the fixed jaw on its front face, the jaw-holder block also having an axial bore which traverses it and within which the inner tubular assembly can slide, and having, on the same side as its rear face, an axial annular slot of larger inside diameter than the axial bore and within which the outer tubular assembly can slide.

3. A device according to claim 1 or 2, characterized by the fact that the movable jaw is articulated on the outer tubular assembly via two side plates which are parallel to each other and to an axial plane of the jaw-holder block, which side plates are arranged at a distance from each other on opposite sides of the fixed jaw; and by the fact that each side plate has a guide groove which forms a cam within which there is engaged a fixed pin which is integral with the jaw-holder block, the movable jaw being held between the two side plates and opposite the fixed jaw.

4. A device according to claim 3, characterized by the fact that the two side plates which bear the movable jaw are articulated on a nut which has a pivot pin and is screwed onto a threaded section of the outer tubular assembly located outside of the jaw-holder block.

5. A device according to claim 2, characterized by the fact that the interlock system comprises, on the one hand, at least one ball retained both in a radial recess of frustoconical shape provided in the radially outer wall of the inner tubular assembly and in a cylindrical radial recess provided in the jaw-holder block radially inward of the axial annular slot and, on the other hand, a radial recess for the ball provided in the inner wall of the outer tubular assembly at the end of the outer tubular assembly contained within the axial annular slot of the jaw-holder block.

6. A device according to claim 1, characterized by the fact that it comprises an axial worm integral with the motor and arranged coaxially in the inner tubular assembly and cooperating with a nut which is integral with the inner tubular assembly and mounted for sliding with the latter in the outer tubular assembly.

7. A device according to claim 2, characterized by the fact that it further comprises the following means:
(a) an axial bushing mounted for axial sliding within that part of the outer tubular assembly which is engaged in the axial annular slot of the jaw-holder block, the axial bushing having an outside diameter slightly less than the inside diameter of said part and having an inside diameter slightly greater than the inside diameter of the axial annular slot, the axial bushing having an end face located outside of the axial annular slot and a frustoconical end face contained within the axial annular slot;
(b) an axial stop integral with the inner wall of the outer tubular assembly and located, with reference to the end of said assembly which is contained in the axial annular slot, at a greater distance away than the end face of the axial bushing which is located outside of the axial annular slot; and
(c) a compression spring resting against the end face of the axial bushing located outside of the axial annular slot and resting against the axial stop.

8. A device according to claim 2, characterized by the fact that the tire push member has, in known manner, a U shape, the web of which is fastened to the end of the inner tubular assembly which is located in front of the front face of the jaw-holder block, the arms of the U-shaped tire push member being arranged on opposite sides of the fixed jaw.

9. A device according to claim 8, characterized by the fact that the tire push member forms a stop limiting the axial sliding of the inner tubular assembly with respect to the jaw-holder block in the direction towards the motor.

10. A device according to claim 5, characterized by the fact that the motor is an impact wrench known per se which is driven pneumatically and is reversably rotatable the output of the impact wrench being coupled to the axial worm via an extension of the worm mounted in needle thrust bearings and in a needle bushing installed in the end of the outer tubular assembly adjacent the impact wrench.

11. A device according to claim 4, characterized by the fact that the distance between the two jaws in closed position is adjustable by displacement of the nut on the threaded section.

12. A device according to claim 1, characterized by the fact that it comprises a lubricant feed which debouches into the region of the fixed jaw and/or of the tire push member.

* * * * *